United States Patent [19]

Goeke et al.

[11] 4,267,309

[45] May 12, 1981

[54] PROCESS FOR PREPARING OLEFIN OXIDE POLYMERIZATION CATALYSTS

[75] Inventors: George L. Goeke, Kendall Park; Frederick J. Karol, Belle Mead, both of N.J.

[73] Assignee: Union Carbide Corporation, New York, N.Y.

[21] Appl. No.: 117,294

[22] Filed: Jan. 31, 1980

Related U.S. Application Data

[60] Division of Ser. No. 928,974, Jul. 28, 1978, Pat. No. 4,193,892, which is a continuation-in-part of Ser. No. 902,566, May 8, 1978, abandoned, which is a continuation of Ser. No. 741,013, Nov. 11, 1976, abandoned.

[51] Int. Cl.$^3$ ............................................. C08G 65/10
[52] U.S. Cl. .................................................... 528/413
[58] Field of Search .......................................... 528/413

[56] References Cited

U.S. PATENT DOCUMENTS

| | | | |
|---|---|---|---|
| 2,969,402 | 1/1961 | Hill et al. | 252/431 N |
| 3,127,358 | 3/1964 | Hill | 528/413 |
| 3,627,702 | 12/1971 | Cehm et al. | 528/413 |

*Primary Examiner*—Earl A. Nielsen
*Attorney, Agent, or Firm*—Gary L. Warner

[57] ABSTRACT

In a process for the preparation of an olefin oxide polymerization catalyst comprising:
  (i) admixing calcium, ammonia, an alkylene oxide modifier, and an organic nitrile modifier, the alkylene oxide consisting of carbon, hydrogen, and oxirane oxygen atoms and the organic nitrile consisting of carbon, nitrogen, and hydrogen atoms, at least one hydrogen atom being acidic, to form a slurry of modified calcium hexammine in ammonia; and
  (ii) evaporating ammonia to provide a solid residue, the improvement comprising:
    aging the solid residue at a temperature in the range of about 150° C. to about 225° C.

3 Claims, No Drawings

PROCESS FOR PREPARING OLEFIN OXIDE POLYMERIZATION CATALYSTS

This application is a division of our prior U.S. application Ser. No. 928,974, filed July 28, 1978, now U.S. Pat. No. 4,193,892, issued Mar. 18, 1980, which is a continuation-in-part of application Ser. No. 902,566, filed May 8, 1978, now abandoned, which is a continuation of application Ser. No. 741,013, filed Nov. 11, 1976, now abandoned.

FIELD OF THE INVENTION

This invention relates to a process for the preparation of catalysts and, more particularly to the preparation of catalysts for use in the polymerization of olefin oxides.

DESCRIPTION OF THE PRIOR ART

The catalytic polymerization of olefin oxides has been practiced for the past several years, one of the commercial processes being the suspension polymerization of ethylene oxide in isopentane using as a catalyst calcium hexammine (Ca (NH$_3$)$_6$) modified with a mixture of propylene oxide and acetonitrile. In this process, it is believed that a living polymer is generated and is eventually terminated by impurities which build up in the medium.

Although this polymerization process has proven successful, it has a certain negative aspect which detracts from optimization and is found both in the polymerization process itself, the process for preparing the catalyst, and the respective polymer and catalyst products. Among other things, this deficiency serves to inhibit the production of high molecular weight polymers and polymerization productivity. It apparently stems from an acute sensitivity to impurities and changes in operating conditions, e.g., catalyst components and their ratios, polymerization time, and chemical and mechanical degradation of the polymer chain. To overcome this deficiency, these processes have come under careful scrutiny but improvements that avoid sensitization of the polymer or catalyst have been few and far between apparently because of the complex mechanism of the polymerization and the complex, and still unknown, structure of the catalyst.

SUMMARY OF THE INVENTION

An object of this invention, therefore, is to provide an improvement in the molecular weight picture and/or in productivity. To achieve this objective, the improvement must necessarily avoid sensitization of the polymer or catalyst at least in those areas which will counter the productivity increase or depress the molecular weight.

Other objects and advantages will become apparent hereinafter.

According to the present invention high molecular weights and/or productivities are achieved by using a catalyst prepared first in the conventional manner comprising:

(i) admixing calcium, ammonia, an alkylene oxide modifier, and an organic nitrile modifier, the alkylene oxide consisting of carbon, hydrogen, and oxirane oxygen atoms and the organic nitrile consisting of carbon, nitrogen, and hydrogen atoms, at least one hydrogen atom being acidic, to form a slurry of modified calcium hexammine in ammonia; and (ii) evaporating ammonia to provide a solid residue and, then, carrying out the improvement which comprises:
aging the solid residue at a temperature in the range of about 150° C. to about 225° C.

The fact that the catalyst is complex, pyrophoric, air sensitive, and insoluble in, or reactive with, most organic solvents makes chemical as well as spectroscopic analyses difficult. Consequently, it is not surprising that the structure of the catalyst prepared by either the conventional process or the improved process, as heretofore described, is unknown. The improved catalyst will have to be, therefore, defined by the process by which it is made.

DESCRIPTION OF THE PREFERRED EMBODIMENT

The catalyst, the process for making the catalyst with the nitrile modifier, and the polymerization process as known prior to subject invention are described in U.S. Pat. No. 2,969,402 issued on Jan. 24, 1961 to Hill et al for "Preparation of Catalysts for the Polymerization of Epoxides", which patent is incorporated by reference herein. The term "hexammoniate" has been changed in the present specification to —hexammine—.

The temperature used in step (i) can be in the range of about minus 50° C. to about plus 25° C. and is preferably in the range of about minus 40° C. to about minus 20° C. or as close as possible to minus 33.5° C. This step is carried out in the liquid phase with ammonia in the liquid state under suitable pressure. An excess of ammonia is desirable, e.g., about 12 to about 125 moles of ammonia per gram atom of calcium. The ammonia is essentially anhydrous. Two modifiers are also introduced in step (i). One of the modifiers is an alkylene oxide consisting of carbon, hydrogen, and oxirane oxygen atoms. Although the number of carbon atoms in the alkylene oxide can range from 2 to about 20 or higher, alkylene oxides having 2 to about 5 carbon atoms are preferred, e.g., ethylene oxide, propylene oxide, 1,2-epoxybutane, and 2,3-epoxybutane. The second modifier is an organic nitrile consisting of carbon, nitrogen, and hydrogen atoms, at least one hydrogen atom being acidic. The nitrile is preferably a saturated aliphatic mononitrile wherein the organic moiety has 2 to about 10 carbon atoms, e.g., acetonitrile, propionitrile, and butyronitrile. Aromatic nitriles such as benzonitrile and ortho-toluenenitrile are also useful.

The alkylene oxide can be used in a ratio of about 0.3 to about 10 moles of alkylene oxide per gram atom of calcium and the nitrile can be used in a ratio of about 0.2 to about 0.8 mole of nitrile per gram atom of calcium. Preferred ratios are about 0.4 to about 1 mole of alkylene oxide and about 0.3 to about 0.6 mole of nitrile, all per gram atom of calcium. Step (i) is preferably carried out with agitation, a slurry of modified calcium hexammine in ammonia being formed. Where an organic diluent is present, a slurry is also formed.

The order of introduction of the calcium, the ammonia, and the modifiers in step (i) can vary. The common procedure is to conduct step (i) in two steps, the first step being to add the calcium to the ammonia to form a solution of calcium hexammine and the second step to add the modifiers. An alternative mode is to introduce the calcium and modifiers first together with a low boiling (and low freezing) organic diluent and then add the ammonia. The least preferred is to add the calcium to a mixture of the ammonia and the modifiers.

The next step, step (ii) is the evaporation of ammonia to provide a solid catalyst residue. This can be accomplished by merely permitting the catalyst slurry to come to room temperature and pressure, or the slurry may be heated gently, e.g., in a cool water bath, to bring it to room temperature, the latter being the usual way of accomplishing the evaporation where step (i) is run at a temperature of about minus 33.5° C., which is a common operating temperature for this process step. Other conventional evaporation or stripping techniques can be applied here. The evaporation is continued until a dry gray solid is observed where it is desired to age the dry solid. This may be done where no diluent or a low boiling organic diluent is used in step (i). Where it is desired to age the catalyst in slurry form, an organic diluent is usually added when a gray pasty solid is present, again where no diluent or where a low boiler is used initially. The evaporation step is usually conducted at ambient temperatures where no organic diluent is present, or it can be conducted at, or slightly higher than, the boiling point of the low boiling diluent if one is used. It can be carried out in the temperature range between the boiling point of ammonia (minus 33.5° C.) and about 100° C., however. The aging step can be conducted on the dry solid or the slurry with no appreciable difference in result.

It is desirable to carry out at least part of the process, or all of the process, in an inert organic liquid diluent, the most preferable condition being when the final catalyst product is in slurry form for transfer to, and direct use, in the olefin oxide polymerization.

The alternative ways of deploying organic diluents in the subject process are as follows:

(a) prepare a dry or pasty solid, slurry with a high or intermediate boiler (using medium stirring), and age;
(b) same as (a) except slurry concurrently with evaporation of ammonia;
(c) carry out the first step in a low boiling, low freezing, organic diluent; strip off ammonia and low boiler to provide dry solid; and age; and
(d) same as (c) except slurry solid during or after stripping with a high boiler, i.e., a diluent which will not boil off during aging, or an intermediate boiler.

The organic diluent referred to above is one which is inert to any of the reactants or the catalyst product and will not be affected by operating conditions except, of course, in cases where it is to be stripped. If the diluent will be used to form the slurry used in the polymerization, it also should be inert to the polymerization reactants and product and the polymerization operating conditions.

The low boiling diluents are exemplified by the $C_5$ and $C_6$ hydrocarbons such as isopentane and hexane. They have low freezing points and are readily stripped during the evaporation step. The high boiling diluents are represented by the $C_{12}$ to $C_{19}$ hydrocarbons, e.g., dodecane and hexadecane. Intermediate boiling diluents are the $C_7$ to $C_9$ hydrocarbons such as heptane and isooctane. The intermediate boilers have low freezing points so that they will not freeze during the stripping step (step (ii)). These intermediate boilers are the choice for continuous plant processes where pressure equipment is available, and are utilized throughout the catalyst process and the polymerization. One advantage of using the inert diluents is in the realm of safety in view of the pyrophoric and air sensitive nature of the catalyst.

As noted, the invention lies in aging the dry catalyst or catalyst slurry at a temperature in the range of about 150° C. to about 225° C. and preferably in the range of about 200° C. to about 225° C. The aging step may be carried out for about 1 to about 15 or more hrs. below about 200° C. and preferably for no more than about 5 or even 3 hrs. above about 200° C. At the end of the aging period the catalyst is cooled to room temperature by air quenching or any other conventional quenching means.

Throughout the preparation of the catalyst, conventional precautions are taken to exclude water, oxygen, and carbon dioxide from the system. This may be accomplished by using properly sealed apparatus together with an inert atmosphere such as nitrogen. The inert gas can be used first as a sweep and then the process steps can be conducted in the same atmosphere.

The finished catalyst in dry or slurry form is then used in the conventional polymerization process. A typical polymerization is described in Example 1. A broad range of olefin oxides and mixtures of olefin oxides can be used, e.g., having 2 to about 20 carbon atoms. A preferred monomer is ethylene oxide. Polymerization temperatures can be in the range of about minus 30° C. to about 150° C., a preferred range for ethylene oxide monomer being about 0° C. to about 60° C. It is generally carried out in an inorganic diluent with agitation and in an inert atmosphere such as nitrogen to exclude oxygen and carbon dioxide. A catalyst concentration in the range of about 0.02 to about 10 percent by weight based on the weight of the olefin oxide feed can be used. Polymerization times can be run from minutes to days depending on the conditions used. Preferred times are about 1 to about 10 hours.

The molecular weights of the various polymers produced by the conventional polymerization process described in more detail hereafter in the examples are approximated by measuring their solution viscosities using a Brookfield viscometer. The solution viscosities are measured as 1% or 5% solutions of polymer in water and are expressed in units of CPS (centipoise). Solution viscosities are correlated with molecular weights via their intrinsic viscosities using the relationship:

$[eta] = 6.4 \times 10^{-5} \, Mw^{0.82}$ in water at 35° C. wherein Mw is weight average molecular weight. Conventional polymers are available in molecular weights ranging from 100,000 to greater than 6 million. With the higher molecular weight resins, viscosity measurements are complicated because of the difficulties encountered in dissolving the resins. During dissolution the mixture assumes a mucous-like consistency with a high tendency to gel. In addition, the extremely long chains are quite sensitive to shearing forces and must be stirred under very low shearing conditions in order to minimize mechanical degradation. The procedure for dissolving these resins may be found in Bulletin numbered F 42993 of May, 1970 published by the Union Carbide Corporation and entitled, "How to Dissolve Polyox Water-Soluble Resins."

The following examples illustrate the invention:

EXAMPLE 1

Redistilled calcium turnings are added to liquid anhydrous ammonia in a vessel which is maintained at atmospheric pressure and about minus 33.5° C. The molar ratio of ammonia to calcium is noted below. The vessel is previously swept with nitrogen and a nitrogen atmosphere maintained. Agitation is used throughout the procedure. A solution is formed, which takes on a blue color. The modifiers; propylene oxide and acetonitrile, are then added and the blue color changes to gray and a slurry is formed. The molar ratio of calcium to modifiers is 1:1 and the molar ratio of propylene oxide to acetonitrile is 3:2. Ammonia is stripped off at temperatures up to 96° C. for about 3 hours and the solid is either unaged, aged in the dry state, or slurried with a high boiler and aged before use in the polymerization. Aging is accomplished at a certain temperature for a certain number of hours hereinafter noted.

The polymerization is typical of the conventional polymerizations used for olefin oxides. It is carried out in a stirred reactor by charging the dry catalyst or catalyst slurry. The monomer, ethylene oxide, is fed on demand so as to maintain a 31° C. reaction temperature. Heat exchange is controlled by reflux cooling of the diluent and the system is continuously purged with nitrogen. The reaction is carried out for a certain length of time, noted below, after which the slurry is centrifuged and the resin product is dried. The polymer is treated with $CO_2$ to minimize polymer degradation and with 0.5 percent anhydrous and particulate colloidal silica to inhibit agglomeration. About 8 percent by weight concentration of monomer is maintained throughout the polymerization. The productivity is measured by determining the number of parts by weight of polymer product per part by weight of calcium present in the catalyst. The solution viscosity is given in CPS and based on a one percent solution at 25° C. as discussed above using a Brookfield Viscometer RVF 2/2.

Variables and results in this example 1 are as follows:
(a) The high boiler is dodecane.
(b) The molar ratio of ammonia to calcium is 100:1.
(c) Aging temperature: 200° C.
(d) Slurry used in aging and polymerization.
(e) Polymerization time: 1 hour.
(f) A catalyst is prepared and four samples are used, one in each of four polymerizations. Aging times and productivities are as follows:

| Sample | Aging Time | Productivity |
|---|---|---|
| 1 | unaged | 187 |
| 2 | 1 hour | 250 |
| 3 | 2 hours | 421 |
| 4 | 3 hours | 436 |

EXAMPLE 2

Example 1 is repeated except as follows:
(a) No organic diluent is used.
(b) The molar ratio of ammonia to calcium is 50:1.
(c) Aging temperature: see below.
(d) Dry solid used in aging and polymerization.
(f) Two catalysts are prepared to provide three samples each; one sample is used in each of six polymerizations. Aging time is one hour. Aging temperatures and productivities are as follows:

| Sample | Aging Temperature °C. | Productivity |
|---|---|---|
|  | First Catalyst |  |
| 1 | unaged | 259 |
| 2 | 200 | 447 |
| 3 | 250 | 172 |
|  | Second Catalyst |  |
| 1 | unaged | 250 |
| 2 | 200 | 432 |
| 3 | 250 | 68 |

EXAMPLE 3

Example 2 is repeated except as follows:
(a) The high boiler is dodecane except as noted below.
(d) Slurry is used in aging and polymerization except as noted below.
(f) A catalyst is prepared and five samples are used, one in each of five polymerizations. Aging time is three hours. Aging temperatures and productivities are as follows:

| Sample | Aging Temperature °C. | Productivity |
|---|---|---|
| 1 | unaged | 303 |
| 2 | 175 | 328 |
| 3 | 200 | 558 |
| 4 | 217 | 743 |
| 5 | 250 (dry solid) | 44 |

EXAMPLE 4

Example 3 is repeated except as follows:
(c) Aging temperature: 200° C.
(f) Four catalysts are prepared to provide two samples each for the first two polymerizations and three samples each for the second two polymerizations. Aging times and productivities are as follows:

| Sample | Aging Time | Productivity |
|---|---|---|
|  | First Catalyst |  |
| 1 | unaged | 259 |
| 2 | 2 hours | 447 |
|  | Second Catalyst |  |
| 1 | unaged | 250 |
| 2 | 2 hours | 432 |
|  | Third Catalyst |  |
| 1 | unaged | 154 |
| 2 | one hour (dry solid) | 221 |
| 3 | one hour | 244 |
|  | Fourth Catalyst |  |
| 1 | unaged | 303 |
| 2 | one hour | 492 |
| 3 | three hours | 558 |

EXAMPLE 5

Example 1 is repeated except as follows:
(e) Polymerization time: see below.
(f) A catalyst is prepared and two samples are used, one in each of two polymerizations. Aging time is 3 hours for both samples. Polymerization times, productivities and solution viscosities follow:

| Sample | Polymerization Time | Productivity | Solution Viscosity |
|---|---|---|---|
| 1 | 1 | 532 | 12,500 |

| Sample | Polymerization Time | Productivity | Solution Viscosity |
|---|---|---|---|
| 2 | 6 | 1917 | 16,360 |

EXAMPLE 6

Example 2 is repeated except as follows:
(a) Same except as noted below.
(c) Aging temperature: 200° C.
(d) Same except as noted below.
(e) Polymerization times noted below.
(f) Four catalysts are prepared to provide eight samples, one for each polymerization. Aging times, polymerization times, and solution viscosities are as follows:

| Sample | Aging Time | Polymerization Time | Solution Viscosity |
|---|---|---|---|
| | | First Catalyst | |
| 1 | unaged | 1 hour | 3720 |
| | | 6 hours | 6000 |
| 2 | 1 hour | 1 hour | 9540 |
| | | 6 hours | 17,700 |
| | | Second Catalyst | |
| 1 | unaged | 1 hour | 1720 |
| | | 6 hours | 3380 |
| 2 | 1 hour | 1 hour | 4880 |
| | | 6 hours | 8340 |
| | | Third Catalyst* | |
| 1 | unaged | 1 hour | 4080 |
| | | 6 hours | 7980 |
| 2 | three hours | 1 hour | 10,120 |
| | | 3½ hours | 16,180 |
| | | Fourth Catalyst* | |
| 1 | unaged | 6 hours | 10,700 |
| 2 | three hours | 6 hours | 16,040 |

*Aging and polymerization conducted with dodecane slurry.

EXAMPLE 7

Example 3 is repeated except as follows:
(a) The high boiler is a mixture of $C_{13}$ and $C_{14}$ straight chain saturated hydrocarbons boiling in the range of about 230° C. (the $C_{13}$–$C_{14}$ mixture is first dried over molecular sieves and purged with nitrogen).
(c) Aging temperature: 215° C.
(f) A catalyst is prepared and three samples are used, one in each of three polymerizations. Aging times, polymerization times, productivities, and solution viscosities are as follows:

| Sample | Aging Time | Polymerization Times | Productivity | Solution Viscosity |
|---|---|---|---|---|
| 1 | unaged | 1 hour | 225 | — |
| | | 6 hours | 588 | 8,930 |
| 2 | three hours | 1 hour | 625 | — |
| | | 6 hours | 1838 | 16,000 |
| 3 | two cycles of three hours each for a total of six hours | 1 hour | 275 | — |

EXAMPLE 8

Example 7 is repeated except as follows:
(c) Aging temperature: 200° C.
(f) Aging time: 3 hours. A catalyst is prepared and samples used in three polymerizations. The polymerization time is 6.5 hours. The combined productivity is 1388 parts by weight of polymer per part by weight of calcium and the solution viscosity is 14,680. The screen classification of resin particle sizes is as follows:

| Mesh Size | Percent Passing through screen |
|---|---|
| 10 | 99.57 |
| 20 | 99.00 |
| 40 | 95.50 |
| 60 | 81.40 |
| 80 | 77.60 |
| 100 | 9.13 |

Note: the small particle size over conventional operations is considered an advantage in certain applications.

EXAMPLE 9

Example 7 is repeated except as follows:
(f) A catalyst is prepared and used in a polymerization. Aging time, polymerization times, and solution viscosity are as follows:

| Aging Time | Polymerization Time | Productivity | Solution Viscosity |
|---|---|---|---|
| three hours | 1 hour | 680 | — |
| | 6 hours | 1755 | 15,600 |

EXAMPLE 10

Example 1 is repeated except as follows:
(f) Three catalysts are prepared substituting for the acetonitrile modifier, the modifier noted below. Aging time is one hour. Modifiers and productivities are as follows:

| Modifier | Productivity (unaged) | Productivity (aged) |
|---|---|---|
| benzonitrile | 43 | 321 |
| ortho-toluonitrile | 60 | 394 |
| trimethylacetonitrile (no acidic hydrogen) | 167 | 193 |

EXAMPLE 11

Example 3 is repeated except as follows:
(a) Hexadecane is used instead of dodecane.
(f) A catalyst is prepared and six samples are used, one in each of six polymerizations. Aging time is one hour. Aging temperatures, productivities, and solution viscosities are as follows:

| Sample | Aging Temperature °C. | Productivity | Solution Viscosity |
|---|---|---|---|
| 1 | unaged | — | 3080 |
| 2 | 150 | — | 4200 |
| 3 | 175 | 374 | 5500 |
| 4 | 200 | 507 | 7620 |
| 5 | 217 | 686 | 10,060 |
| 6 | 250 | 18 | — |

Polyethylene oxide plant production data indicate that by raising the catalyst treatment temperature from 96°–97° C. to 156°–158° C., the yield of polyethylene oxide was increased an average of about 36% and the 1% viscosity of polyethylene oxide increased about 160%. These data are presented below:

| Run No. | Catalyst Treatment | | | | Performance | |
|---|---|---|---|---|---|---|
| | Temp. °C. | Hrs | Amount Used | | Yield | Viscosity 1% (cps) |
| | | | Lbs | % Ca. | | |
| 1 | 158 | 4.5 | 12 | | 921 | 7410 |
| 2 | 158 | 4.5 | 14 | 0.12 | 728 | 7310 |
| 3 | 156 | 4.5 | 14 | 0.10 | 878.6 | 8200 |
| 4 | 156 | 4.5 | 14 | 0.13 | 935 | 7920 |
| 5 | 158 | 6.0 | 14.1 | 0.10 | 979 | 9300 |
| 6 | 158 | 6.0 | 12 | 0.14 | 1166 | 6960 |
| 7 | 158 | 4.5 | 11 | 0.13 | 1300 | 11920 |
| 8 | 156 | 4.5 | 12 | 0.14 | 987 | 7400 |
| 9 | 97 | 4.5 | 14 | 0.10 | 971 | 3390 |
| 10 | 97 | 4.5 | 14 | 0.14 | 693 | 3100 |
| 11 | 96 | 4.5 | 15 | 0.11 | 716 | 3258 |
| 12 | 96 | 4.5 | 14 | 0.16 | 617 | 2825 |
| 13 | 96 | 4.5 | 15 | 0.18 | 883 | 3263 |
| 14 | 97 | 4.5 | 15 | 0.16 | 663 | 2847 |
| 15 | 97 | 4.5 | 15 | 0.13 | 543 | 3708 |

Yield is defined as lbs. of polyethylene oxide produced per lb. of catalyst used.

We claim:
1. In a process for the polymerization of olefin oxides, the improvement comprising carrying out the process in the presence of a catalytically active amount of the catalyst prepared by a process which comprises:
   (i) admixing calcium, ammonia, an alkylene oxide modifier and an organic nitrile modifier, the alkylene oxide consisting of carbon, hydrogen, and oxirane oxygen atoms and the organic nitrile consisting of carbon, nitrogen, and hydrogen atoms, at least one hydrogen atom being acidic, to form a slurry of modified calcium hexamine in ammonia;
   (ii) evaporating ammonia to provide a solid residue; and
   (iii) aging the solid residue at a temperature in the range of about 150° C. to about 225° C.
2. The process for the polymerization of olefin oxides defined in claim 1 in which the aging time of the solid residue is about 1 to about 15 hours.
3. The process defined in claim 1 in which the solid residue is aged at a temperature wherein the lower end of the range is about 200° C.

* * * * *